US006779832B2

(12) United States Patent
D'Assumcao

(10) Patent No.: US 6,779,832 B2

(45) Date of Patent: Aug. 24, 2004

(54) SIDE DOOR ASSEMBLY

(75) Inventor: Didier D'Assumcao, Verneuil sur Seine (FR)

(73) Assignee: Wagon Engineering, Inc., Southfield, MI (US)

(*) Notice: Subject to any disclaimer, the term of this patent is extended or adjusted under 35 U.S.C. 154(b) by 0 days.

(21) Appl. No.: 10/391,822

(22) Filed: Mar. 19, 2003

(65) Prior Publication Data

US 2004/0003484 A1 Jan. 8, 2004

(30) Foreign Application Priority Data

Mar. 19, 2002 (FR) .......................................... 02 03397
Mar. 10, 2003 (EP) .......................................... 03290584

(51) Int. Cl.[7] .......................................... B60J 5/06

(52) U.S. Cl. .......................... 296/155; 296/105; 49/360; 49/216

(58) Field of Search .......................... 296/155, 147, 296/146.2, 105, 100.12, 100.03; 49/502, 352, 375, 213, 218, 409; 312/330.1; 4/559; 160/213; 16/87 R, 95 R; 248/298.1

(56) References Cited

U.S. PATENT DOCUMENTS

| | | | | | |
|---|---|---|---|---|---|
| 4,464,863 | A | * | 8/1984 | Chikaraishi et al. | 49/213 |
| 4,544,198 | A | * | 10/1985 | Ochiai et al. | 296/155 |
| 4,560,197 | A | * | 12/1985 | Minami | 296/155 |
| 4,833,829 | A | * | 5/1989 | Wilson | 49/426 |
| 4,998,304 | A | * | 3/1991 | Sauter et al. | 4/559 |
| 5,224,296 | A | * | 7/1993 | Brignon | 49/217 |
| 5,546,972 | A | * | 8/1996 | Wardell et al. | 296/105 |
| 5,906,071 | A | * | 5/1999 | Buchanan, Jr. | 49/214 |
| 5,934,022 | A | * | 8/1999 | Faubert | 49/360 |
| 5,992,097 | A | * | 11/1999 | Makiuchi et al. | 49/216 |
| 6,390,536 | B2 | * | 5/2002 | Tsubokura et al. | 296/155 |
| 6,430,875 | B1 | * | 8/2002 | Clark et al. | 49/360 |
| 6,550,848 | B2 | * | 4/2003 | Kleemann | 296/155 |

FOREIGN PATENT DOCUMENTS

| | | | |
|---|---|---|---|
| DE | 2062822 | * | 8/1972 |
| DE | 2412936 | * | 10/1975 |
| DE | 3107999 | * | 8/1982 |
| DE | 3541812 | * | 3/1987 |
| DE | 19828336 | * | 12/1999 |
| GB | 2112841 | * | 10/1982 |
| GB | 2248047 | * | 9/1990 |

* cited by examiner

*Primary Examiner*—Kiran Patel
(74) *Attorney, Agent, or Firm*—Clark Hill PLC

(57) ABSTRACT

A support and guidance unit for a sliding door of a motor vehicle includes a support adapted to be fitted onto a first structure element of a motor vehicle. A roller assembly is rotationally mounted around a first axis X—X on the support and is adapted to roll on a support and guidance rail. The support and guidance rail is adapted to be fitted onto a second structure element of the motor vehicle and devised to slide with respect to the said first structure element. The roller assembly has two running surfaces extending on both sides of a plane of symmetry M—M, that extends perpendicularly to the said first axis X—X in that the normals to the running surfaces have axial components C1, C2 parallel to the first axis and oriented towards opposite directions.

21 Claims, 3 Drawing Sheets

SIDE DOOR ASSEMBLY

BACKGROUND ART

1. Field of the Invention

The invention concerns a support and guidance unit for a sliding door of a motor vehicle. More specifically, the invention relates to sliding side doors on recreational or commercial vehicles.

2. Description of the Related Art

Motor vehicle sliding doors, comprising a support and guidance system constituted by a support roller and two guide rollers are known. The support roller is mounted so as to be freely moving when rotating around a horizontal shaft, while the two guide rollers are freely-moving when rotating around two vertical parallel shafts. When mounted, the unit is located in a rail with a hollow profile of rectangular cross-section, so that it can slide along this rail. To allow the support and guidance unit to move, the distance between the two walls of the hollow profile is slightly greater than the diameter of the guide roller.

Consequently, when the door slides between its open and closed positions, the guide rollers are not always in contact with the wall of the profile and collide alternately with both walls, generating unpleasant noise for the passengers of the motor vehicle as well as the operator of the sliding door. Moreover, the support rollers are usually manufactured by forging. The die separation surface cuts the running surface. Consequently, the forged roller has to be thoroughly deburred to avoid damaging the guide rail running surface. The process of deburring is expensive. In addition, such support and guidance units comprise many parts, which makes them expensive to produce and assemble.

SUMMARY OF THE INVENTION

The objective of the invention is to circumscribe these drawbacks and to recommend a support and guidance unit that generates very little noise during operation, and is easy and economical to manufacture, while ensuring efficient side door guidance when sliding. For this purpose, this invention concerns a unit of the aforesaid type, which is a support and guidance unit for a sliding door of a motor vehicle. The support and guidance unit includes a support adapted to be fitted onto a first structure element of a motor vehicle. A roller assembly is rotationally mounted around a first axis X—X on the support and is adapted to roll on a support and guidance rail. The support and guidance rail is adapted to be fitted onto a second structure element of the motor vehicle and devised to slide with respect to the said first structure element. The roller assembly has two running surfaces extending on both sides of a plane of symmetry M—M, that extends perpendicularly to the said first axis X—X in that the normals to the running surfaces have axial components C1, C2 parallel to the first axis and oriented towards opposite directions.

BRIEF DESCRIPTION OF THE DRAWINGS

The following description will make it easier to understand the invention. It is given only as an example and drawn up with reference to the enclosed drawings, on which.

DETAILED DESCRIPTION OF THE PREFERRED EMBODIMENTS

Figure 1:
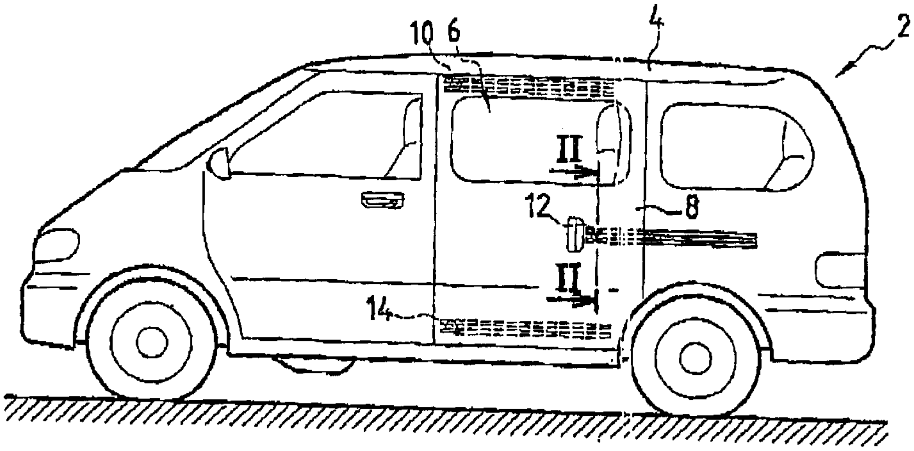
FIG. 1 is a side view of a vehicle with a sliding door according to one embodiment of the invention.

Referring to FIG. 1, a minivan-type motor vehicle or a commercial vehicle is generally indicated at 2. In the following paragraphs, the terms “front,” “rear” and “sideways” shall be used to describe the usual orientation of the vehicle 2. The vehicle 2 includes a body 4 defining a side opening 6, which gives access to the inside of the vehicle 2, and more specifically to the rear part of the passenger compartment. A sliding side door 8 is mounted on the side of body 4. The side door 8 is freely-moving from a front position, which closes and seals the side opening 6 (FIG. 1) to a rear position, which provides access to the passenger compartment via the side opening 6. This position is not illustrated in the Figures.

The side door 8 is fastened to the body through three slide units, including a top slide unit 10, which consists of a support roller, known as such, a median slide unit 12 and a low slide unit 14, for support and guidance respectively. The slide units 10, 12 and 14 are interposed between body 4 and side door 8.

There are two purposes for the support and guidance units 12, 14. First, the support and guidance units 12, 14 are designed to support the weight of door 8. Second, the support and guidance units 12, 14 guide the side door 8 sideways when it is moved. The median support and guidance unit 12 will be described in greater detail below, whereas the low support and guidance unit 14 is identical to the median support and guidance unit 12 and, therefore, will not be described in greater detail.

The median support and guidance unit 12 includes a roller module 16 and a median support and guidance rail 18. The roller module 16 is held, as shown on FIG. 2, by the median support and guidance rail 18. The roller module 16 includes a pin 20 which extends along an initial axis X—X, perpendicular to the general drawing of side door 8. The pin 20 has a threaded end 22. The roller module 16 is secured to the side door 8 with a nut 24 and a locknut 26. Once the side door 8 is assembled, the pin 20 extends horizontally. The pin 20 has a flange 28, at its distal section of door 8, that forms a central stop, integral with pin 20 that defines a plane of symmetry M—M.

The roller module 16 also includes a roller assembly, generally indicated at 30. The roller assembly 30 includes two identical rollers 32, 34 mounted on the pin 20 on either side of the median plane M—M and, more specifically, the central stop 28. The rollers 32, 34 are mounted to complement each other with regard to their respective orientations. These rollers 32, 34 are freely-moving during rotation and translation on pin 20.

The roller 32 has two flat opposing sidewalls 36 and 38, respectively, one of which faces the body 4 and the other faces the central stop 28. These two walls 36, 38 are interconnected by a curved section 40 forming a running surface. This running surface 40 preferably has the convex domed shape of a spherical section. Running surface 40 has a normal plane, $N_1$, with an axial component $C_1$ extending parallel to the axis X—X.

Similarly, the second roller 34 has two lateral, opposite flat walls 42, 44 respectively, wherein one flat wall 42 faces the side door 8 and the other flat wall 44 faces the central stop 28. These two walls are interconnected by a curved section 46 forming a running surface 46. This running surface 46 preferably has the convex domed shape of a spherical section. The running surface 46 has a normal plane, $N_2$, with an axial component $C_2$ extending parallel to the axis X—X. In other words, the running surface 40, 46 of the roller which is closest to each end of the pin 20 includes an axial component $C_1$, $C_2$ oriented towards the end of pin 20.

The roller assembly 30 includes two spring elements 48, 50. The spring elements 48, 50 are Belleville washers, which are inserted between each roller 32, 34 and the central stop 28. The two Belleville washers 48, 50 push each roller 32, 34 in the axial direction of the running surfaces 40, 46 of rollers 32,34, respectively.

Therefore, the Belleville washer 48 is inserted between the side wall 38 of the roller 32 and the central stop 28, to exert thrust on the roller 32 in the direction of body 4, and the Belleville washer 50 is inserted between the side wall 44 of the roller 32 and the central stop 28, to exert thrust on roller 34 in the direction of side door 8. The rollers 32, 34 are therefore pushed in opposite axial directions so as to separate them from each other.

The pin 20 also has two annular grooves 52, 54 on either side of the central stop 28. A split snap-ring 56, 58 is clipped into each groove 52, 54, on either side of the rollers 32, 34 opposite the central stop 28. The split snap-rings 56, 58-form lateral stops and limit the axial displacement of rollers 32, 34 when they are not stressed by the weight of the door 8.

The part of roller assembly 30 which is inside median support and guidance rail 18 is symmetrical to the plane M—M. The median support and guidance rail 18 includes a profile 60, made of extruded metal for example, fitted to the side of the body 4 of the vehicle 2 using conventional mounts (not illustrated). This profile 60 has an approximately hexagonal cross section.

The transverse section is the same along the whole length of median support and guidance rail 18 and is symmetrical to a central plane C—C that extends horizontally and, therefore, parallel to the axis X—X, in the assembled median support and guidance rail 18.

The profile 60 has an initial pair 62 of rectilinear, V-shaped tracks 64, 66, with the V opening towards rollers 32, 34. The tracks 64, 66 face each other. The roller 32 rests on track 64 while roller 34 rests on track 66. Therefore, the initial pair 62 of tracks has a shape that complements the running surfaces 40, 46 of the rollers 32, 34. On the opposite side of the initial pair 62 of tracks, the profile 60 has a second pair 68 of tracks 70, 72 identical to the initial pair 62.

Both pairs 62, 68 of tracks are connected via a central connecting branch 74 which is mounted on chassis 4. On the opposite side of connecting branch 74, profile 60 has two edges 76, 78 that define the clearance 80 for pin 20.

The distance d between central stop 28 and each of the split snap-rings 56, 58 is chosen in such a manner that, when rollers 32, 34 come into contact with the snap rings 56, 58, the roller assembly 30 is prevented from having simultaneous contact of rollers 32, 34 with the two pairs of tracks 62, 68 of the rail.

Figure 2:
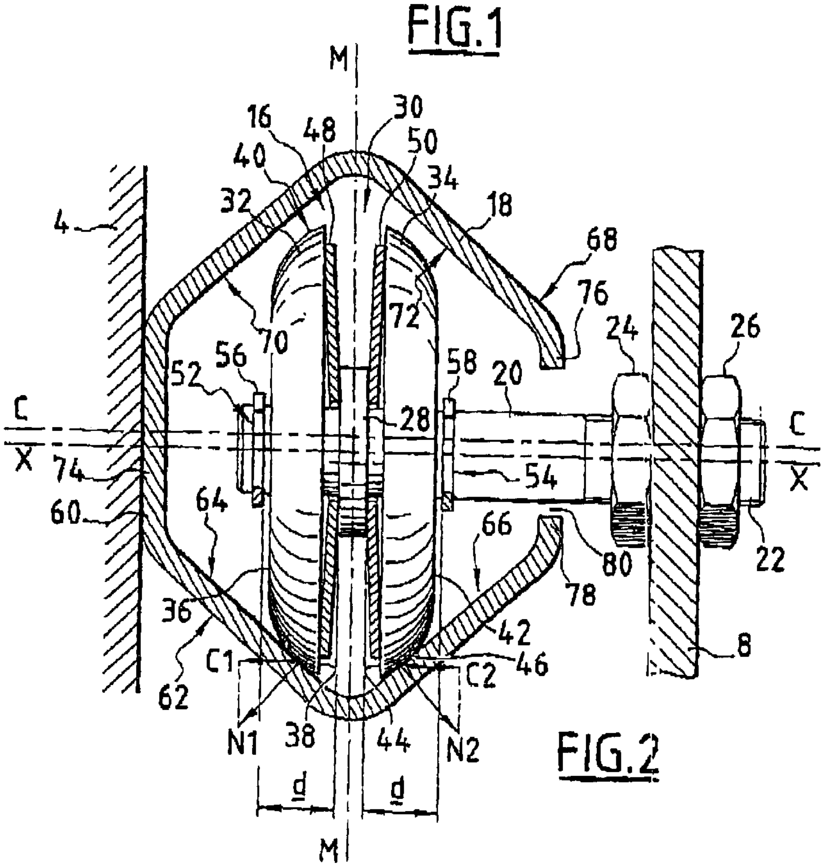
FIG. 2 is a sectional view following line II—II of FIG. 1.

Due to the fact that both pairs 62, 68 of tracks are symmetrical to plane M—M, rail 18 and roller module 16 can be used for a left-hand door 8 (as shown) or a right-hand door. In the latter case, the median support and guidance rail 18 and roller module 16 are rotated through 180° as shown in FIG. 2, so that rollers 32, 34 lean on the second pair 68 of tracks.

The median support and guidance rail 18 is assembled and fitted as follows: The Belleville washers 48, 50 as well as rollers 32, 34, are mounted on the pin 20 on both sides of central stop 28. The split snap-rings 56, 58 are then secured into the grooves 52, 54.

Finally, the roller module 16 is screwed onto the side door 8 and fitted by the nut 24 and locknut 26. A first roller module 16 is fitted onto the rear median part of side door 8, while a second module, identical to the first one, is fitted onto the bottom front part of door 8. A carrying module 10, known as such, is fitted onto the relevant front top part of door 8.

The median support and guidance rails 18 are fitted to body 4 of the vehicle, using screws for example. Then, each roller module 16 is threaded onto the corresponding rail 18. When door 8, under the action of its own weight, pushes rollers 32, 34 against tracks 64, 66 of the first pair of tracks 62, the radial force acting on rollers 32 and 34 is converted into a radial component and an axial component which cause each roller 32, 34 to counter the force of the associated Belleville washer 48, 50.

Consequently, each of the roller 32, 34 is constantly pushed against the corresponding track 64, 66 while sliding, which avoids any noise due to contact between rollers 32, 34 and tracks 64, 66. Moreover, the manufacturing tolerances relating to the gap between the two support and guidance units 12, 14 are compensated for.

The fact that both rollers 32, 34 are identical leads to a low operating cost. Both of the rollers 32, 34 of a roller module 16 are mounted along the same axis X—X. Consequently, handling is easy during the assembly.

Figure 3:
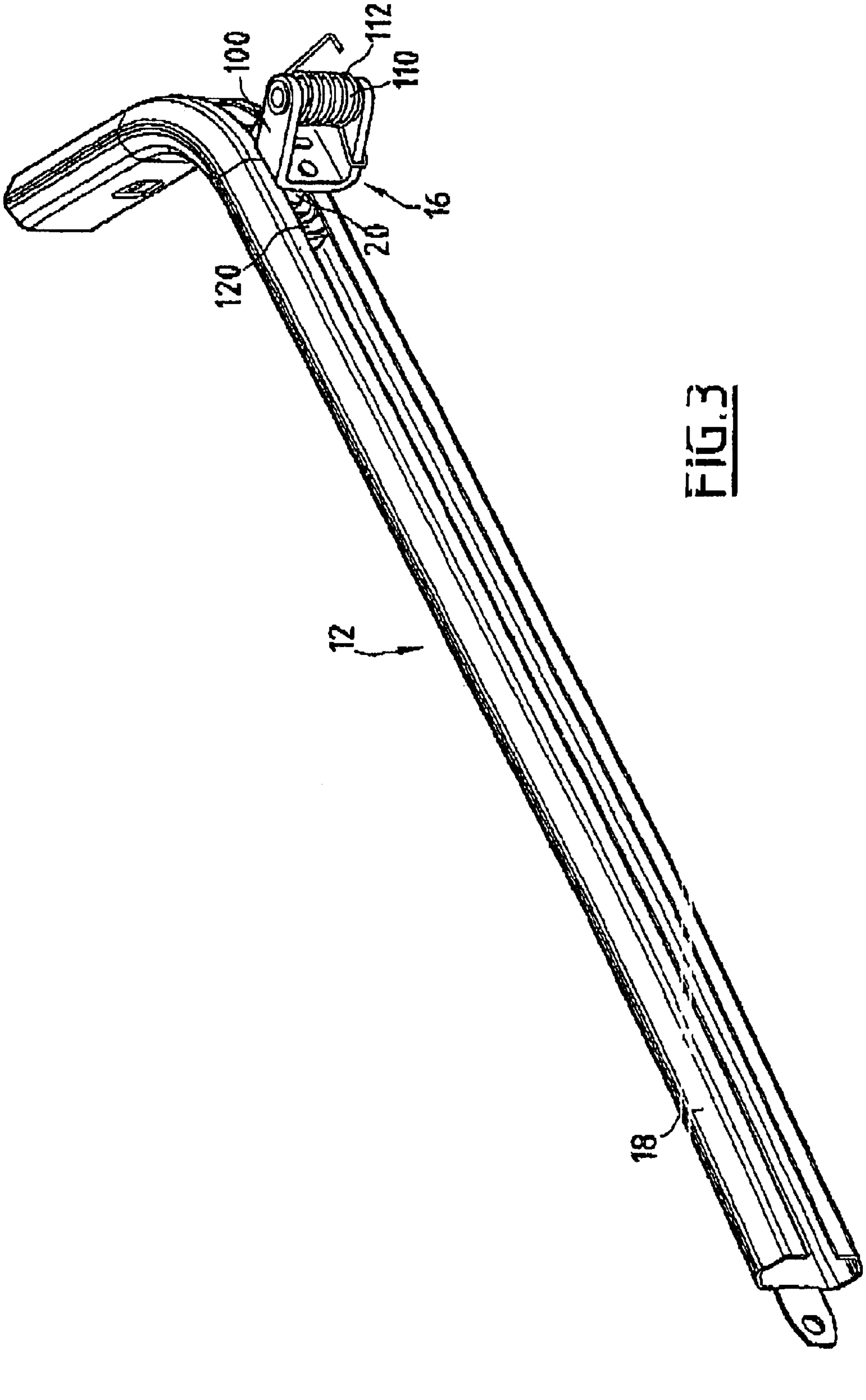
FIG. 3 is a perspective view of a support and guidance unit according to a second embodiment of the invention.

FIG. 3 shows a support and guidance unit, in a perspective view, according to a second method of producing the invention. Below, only the differences relative to the first design method will be described. Similar elements have the same references.

The support and guidance unit 12 includes a support and guidance unit 18 identical to that of the initial design method. Moreover, support and guidance unit 12 has a roller module 16. The roller module 16 consists of a support 100, which has a base composed of a flange 102, which is more or less C-shaped. Flange 102 is made from a single part by bending sheet metal. It consists of two parallel free branches 104, a central branch 106 and an extra branch 108. An extra branch 108 extends from central branch 106, parallel to the axis X—X. It also extends parallel to free branches 104 and on the side of central branch 106, opposite to free branches 104.

Support 100 also has joint bushing 110, inserted between free branches 104 of flange 102. Joint bushing 110 extends along a second axis Y—Y. This axis Y—Y is perpendicular to the axis X—X, and when mounted, is generally vertical to it. The support 100 is joined by bushing 110 to a structural element of the vehicle, in this case, the side door 8.

The roller module 16 also includes a coil spring 112 wound around joint bushing 110. This spring 112 rests partly on support 100 and partly on the side door 8, and pushes support 100 to a position in which the first axis X—X extends more or less perpendicularly to the plane of door 8.

Pin 20 of roller module 16 is connected to central branch 106 of the support. In addition, the roller module 16 includes a roller assembly 30 formed of a single roller 120, which is rotationally mounted to pin 20 of the module.

Roller 120 includes two parts 122, 124 rotating together around the axis X—X, each of which carries one of the running surfaces 40, 46. Running surfaces 40, 46 have a tapered shape and extend on either side of the plane of symmetry M—M, at a distance from this plane M—M. Thus, running surfaces 40, 46 of roller 120 also have normals $N_1$, $N_2$; therefore axial components C1, C2 extend in opposite directions.

Running surfaces 40, 46 are connected by a cylindrical surface 126. Roller 120 is made all in one piece, and preferably from a single part. In this instance, the roller is produced by forging.

Figure 4:
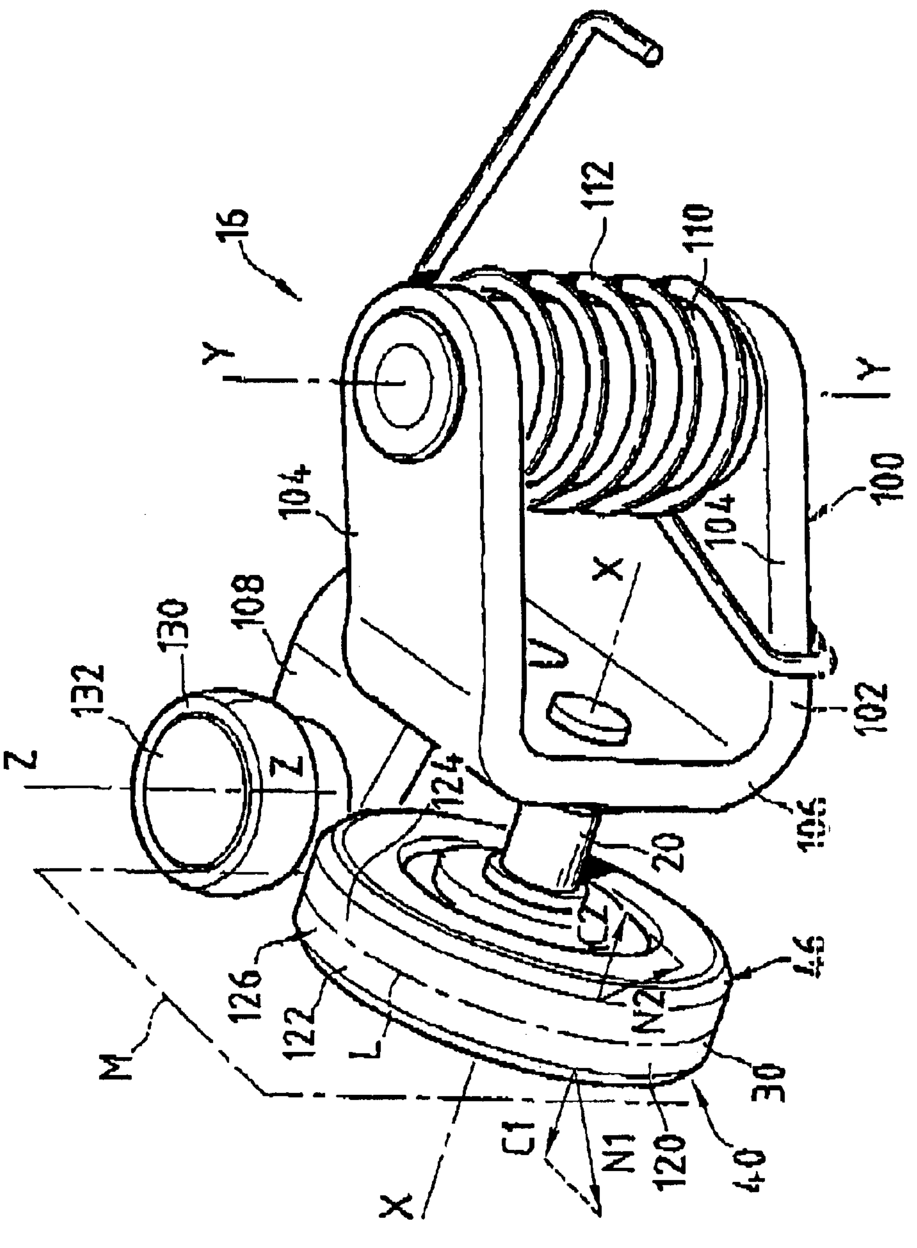
FIG. 4 is a perspective view of the roller module of the unit in FIG. 3.

FIG. 4 shows line of separation L from the forging die. This line L extends in the plane of symmetry M—M and is therefore completely outside running surfaces 40, 46, so that roller 120 just needs rough deburring.

Roller module 46 also includes a single side guide roller 130. Side guide roller 130 is fitted onto a spur 132 of additional branch 108 of support 100. Side guide roller 130 is freely moving in rotation around an axis Z—Z that extends perpendicular to axis X—X and parallel to axis Y—Y.

In another alternative version, the roller module has a pin holder articulated, with respect to the door, around an axis that is vertical to the mounted position. Two parallel pins 20, each with a pair of rollers 32, 34 and a pair of Belleville washers 48, 50 as described above, are connected to this support, one behind the other in the direction of rail 18.

Generally speaking, running surfaces 40, 46 are tilted towards the first axis X—X at every point of an angle greater than 5°, preferably an angle greater than 10°. Another alternative is that tracks 64, 66 or 70, 72 of track pairs 62, 68 are connected by a flat part which is perpendicular to the plane M—M and parallel to the plane C—C. Consequently, rail 18 has an octagonal cross-section. Both rollers 32, 34 can thus be separated from each other with by a considerable distance, while rail 18 retains small overall dimensions perpendicular to the median plane C—C.

I claim:

1. A support and guidance unit for a sliding door of a motor vehicle, said median support and guidance unit comprising:

- a support (22, 100) adapted to be fitted onto a first structure element (8) of a motor vehicle,
- a roller assembly (30) rotationally mounted around a first axis X—X on the support (22, 100) and adapted to roll on a support and guidance rail (18), the support and guidance rail being adapted to be fitted onto a second structure element (5) of the motor vehicle and devised to slide with respect to the said first structure element (8),
- characterized in that the roller assembly (30) has two running surfaces (40, 46) extending on both sides of a plane of symmetry (M—M), that extends perpendicularly to the said first axis (X—X),
- and in that the running surfaces' (40,46) normals (N1, N2) have axial components (C1, C2) parallel to the said first axis and oriented towards opposite directions.

2. A unit according to claim 1, characterized in that each of the normals' (N1, N2) axial components (C1, C2) of the running surfaces is oriented contrary to the plane of symmetry (M—M).

3. A unit according to claim 2, characterized in that each running surface (40, 46) shows a convex or tapered domed shape.

4. A unit according to claim 3, characterized in that the roller assembly (30) includes two rollers (32, 34) coaxially mounted onto each other, each roller (32, 34) having one of the running surfaces (40,46).

5. A unit according to claim 4, characterized in that the two rollers (32, 34) are freely-moving in translation around the said first axis (X—X), and in that the unit includes spring devices (48, 50) adapted to oppose an axial movement of each of the rollers(32, 34) under the action of a radial force acting onto the respective running surface (40, 46).

6. A unit according to claim 5, characterized in that the spring devices include a spring element (48, 50) placed between both rollers (32, 34) and stressing the said rollers in opposite axial directions.

7. A unit according to claim 6, characterized in that the unit comprises in addition axial stop devices (28, 56, 58) adapted to limit both rollers' (32, 34)axial displacement.

8. A unit according to claim 7, characterized in that the axial stop devices include a first stop (28) placed between both rollers (32, 34).

9. A unit according to claim 8, characterized in that the spring devices include two spring devices (48, 50), each of which is interposed between the first stop (28) and a respective roller (32, 34), both spring devices being more specifically formed by two Belleville washers (48, 50).

10. A unit according to claim 9 characterized in that the axial stop devices include two second stops (56, 58) placed on one side and on the other side of the two rollers (32, 34).

11. A unit according to claim 10, characterized in that the rollers (32, 34) are symmetrical.

12. A unit according to claim 11, characterized in that the roller assembly (30) comprises a roller (120) with two parts (122, 124), each of which has one of the running surfaces (40, 46), both parts (122, 124) being integral in rotation around the said first axis (X—X).

13. A unit according to claim 12, characterized in that the roller (120) is made all in one piece from and more specifically from a single part.

14. A unit according to claim 13, characterized in that the unit comprises in addition a side guide roller (130), more specifically one single side guide roller, rotationally mounted to the support (100) around a second axis (Z—Z), extending perpendicularly to the said first axis (X—X).

15. A unit according to claim 14, characterized in that the running surfaces (40, 46) are inclined to the said first axis at any point of an angle that is greater than 5° and preferably greater than 10°.

16. A unit according to claim 15, characterized in that it comprises in addition a support and guidance rail (18) that comprises a first pair of running tracks (62) that complement the roller assembly's (30) running surfaces (40, 46).

17. A unit according to claim 16, characterized in that the support and guidance rail (18) has a second pair of running tracks (68) that is identical to the said first pair of tracks (62) and placed facing the latter, and in that the said second pair of tracks (68) is at a distance from the said first pair of tracks (62) such that, in the roller assembly's (30) non stressed condition, the running surfaces (40,46) come into contact with only one of both pairs of running tracks (62, 68) at a time.

18. A unit according to claim 17, characterized in that the transverse section profile of each pair of tracks (62, 68) is virtually V-shaped, and the tracks of each pair (62, 68) are oriented towards each other.

19. A unit according to claim 18, characterized in that the guidance rail (18) is constituted by a constant transverse section profile over its length, more specifically by an extruded profile.

20. A unit according to claim 19, characterized in that the profile has a general hexagonal transverse section.

21. A unit according to claim 20, characterized in that the two tracks (62, 66; 70, 72) of each of the pairs of tracks (62, 68) are connected to each other by a flat section, so that the profile has a general octagonal transverse section.

* * * * *